United States Patent
Klemen et al.

(10) Patent No.: US 7,214,154 B2
(45) Date of Patent: May 8, 2007

(54) ELECTRICALLY VARIABLE TRANSMISSION HAVING SIX FIXED SPEED RATIOS

(75) Inventors: Donald Klemen, Carmel, IN (US); Michael R. Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 185 days.

(21) Appl. No.: 11/032,791

(22) Filed: Jan. 11, 2005

(65) Prior Publication Data
US 2006/0154771 A1 Jul. 13, 2006

(51) Int. Cl.
*F16H 3/72* (2006.01)
(52) U.S. Cl. ............................. 475/5; 475/277; 475/282
(58) Field of Classification Search ................... 475/10, 475/149, 277, 282, 288, 330, 3
See application file for complete search history.

(56) References Cited

U.S. PATENT DOCUMENTS

| | | | |
|---|---|---|---|
| 5,558,588 A | 9/1996 | Schmidt | 475/5 |
| 5,931,757 A | 8/1999 | Schmidt | 475/2 |
| 6,010,422 A * | 1/2000 | Garnett et al. | 475/5 |
| 6,976,931 B2 * | 12/2005 | Raghavan et al. | 475/296 |
| 2005/0261097 A1* | 11/2005 | Klemen et al. | 475/5 |
| 2006/0063628 A1* | 3/2006 | Sowul et al. | 475/5 |

* cited by examiner

*Primary Examiner*—Roger Pang
*Assistant Examiner*—Edwin A. Young
(74) *Attorney, Agent, or Firm*—Dan L. Thompson

(57) ABSTRACT

A two-mode, compound-split, electro-mechanical transmission utilizes an input member for receiving power from an engine, and an output member for delivering power from the transmission. First and second motor/generators are operatively connected to an energy storage device through a control for interchanging electrical power among the storage device. The transmission employs three planetary gear sets that cooperate with a plurality of torque transmitting devices to provide two distinct gear trains or power paths corresponding to two modes of electrically variable operation in which the speed ratio between the input member and the output member varies with the speed of at least one of the motor/generators. The torque transmitting devices are selectively engageable to provide six discrete, fixed speed ratios.

9 Claims, 1 Drawing Sheet

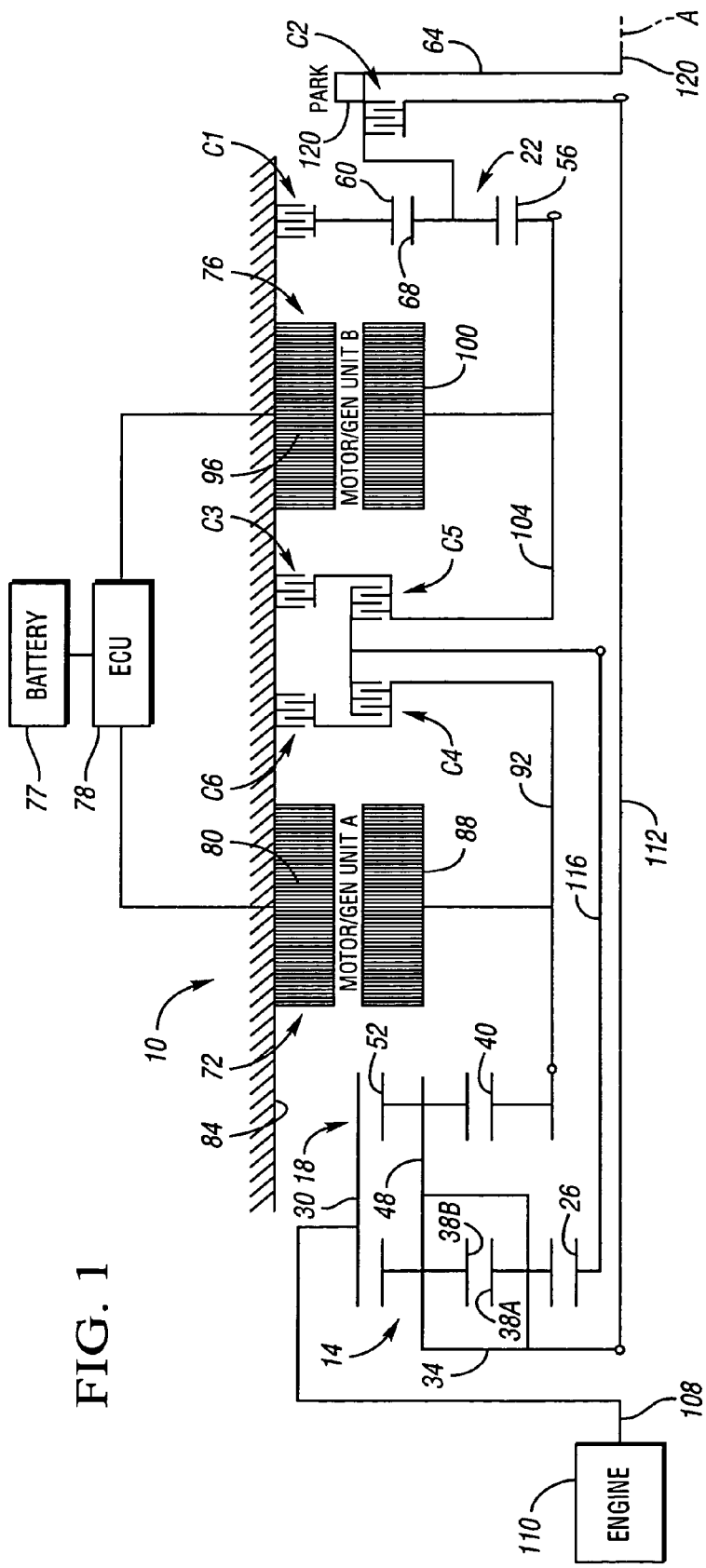

ELECTRICALLY VARIABLE TRANSMISSION HAVING SIX FIXED SPEED RATIOS

TECHNICAL FIELD

The present invention relates to a two-mode, compound-split, hybrid electro-mechanical vehicular transmission that utilizes three interactive planetary gear arrangements that are operatively connected to an engine and two motor/generators. The planetary gear arrangements provide two modes, or gear trains, that are selectively available to transmit power from the engine and/or the motor/generators to the output member of the transmission. The transmission also provides six available fixed ratios.

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven. As such, the drive members may be front wheels, rear wheels or a track, as required to provide the desired performance.

A series propulsion system is a system in which energy follows a path from an engine to a first motor/generator, then to an optional electric storage device, and then to a second motor/generator which applies power to rotate the drive members. There is no direct mechanical connection between the engine and the drive members in a series propulsion system.

Transmissions adapted to receive the output power from either an engine-driven generator or an energy storage device, or both, have heretofore relied largely on what has been designated as series, hybrid propulsion systems. Such systems are designed with auxiliary power units (APUs) of relatively low power for minimum emissions and best fuel economy. However, such combinations of small APUs and even large energy storage devices do not accommodate high-average power vehicles or address duty cycles that demand continuous, constant speed operation. Steep grades and sustained high-average cruising speeds at desired high efficiencies are not achievable with a typical, series, hybrid transmission configuration.

The challenge, therefore, is to provide a power system that will operate at high efficiencies over a wide variety of operating conditions. Desirable electric variable transmissions should leverage the benefits of a series, hybrid transmission for desirable low-average power duty cycles—i.e., low speed start/stop duty cycles—as well as the benefits of a parallel hybrid transmission for high-average output power, high speed duty cycles. In a parallel arrangement, the power supplied by the engine and the power supplied by the source of electrical energy are independently connected to the drive members to ensure maximum efficiency in both low and high average power duty cycles.

Moreover, perfecting a concept wherein two modes, or two integrated power split gear trains, with either mode available by synchronous selection of internal clutching by the on-board computer to transmit power from the engine and/or the motor/generator to the output shaft, results in a hybrid transmission having an extremely wide range of applications.

The desired beneficial results may be accomplished by the use of a variable, two-mode, input and compound split, parallel hybrid electro-mechanical transmission. Such a transmission utilizes an input member to receive power from the vehicle engine and a power output member to deliver power to drive the vehicle. First and second motor/generator power controllers are connected to an energy storage device, such as a battery pack, so that the energy storage device can accept power from, and supply power to, the first and second motor/generators. A control unit regulates power flow among the energy storage devices and the motor/generators as well as between the first and second motor/generators.

A variable, two-mode, input-split, parallel, hybrid electro-mechanical transmission also employs at least one planetary gear set. The planetary gear set has an inner gear member and an outer gear member, each of which meshingly engages a plurality of planet gear members. The input member is operatively connected to one of the gear members in the planetary gear set, and means are provided operatively to connect the power output member to another of the gear members in the planetary gear set. One of the motor/generators is connected to the remaining gear member in the planetary gear set, and means are provided operatively to connect the other motor/generator to the output shaft.

Operation in the first or second mode may be selectively achieved by using torque transfer devices. Heretofore, in one mode the output speed of the transmission is generally proportional to the speed of one motor/generator, and in the second mode the output speed of the transmission is generally proportional to the speed of both motor/generators.

In some embodiments of the variable, two-mode, input-split, parallel, hybrid electro-mechanical transmission, a second planetary gear set is employed. In addition, some embodiments may utilize three torque transfer devices—two to select the operational mode desired of the transmission and the third selectively to disconnect the transmission from the engine. In other embodiments, all three torque transfer devices may be utilized to select the desired operational mode of the transmission.

With reference, again, to a simple planetary gear set, the planet gear members are normally supported for rotation on a carrier that is itself rotatable. When the sun gear is held stationary and power is applied to the ring gear, the planet gear members rotate in response to the power applied to the ring gear and thus "walk" circumferentially about the fixed sun gear to effect rotation of the carrier in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be determined by knowing the number of teeth present in the gear members of the planetary gear set.

Whenever the carrier is restrained from spinning freely, and power is applied to either the sun gear or the ring gear, the planet gear members act as idlers. In that way, the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

As those skilled in the art will appreciate, a transmission system using a power split arrangement will receive power from two sources. Utilization of one or more planetary gear sets permits two or more gear trains, or modes, by which to deliver power from the input member of the transmission to the output member thereof.

U.S. Pat. No. 5,558,588 issued Sep. 24, 1996, to Schmidt, and which is hereby incorporated by reference in its entirety, teaches a variable, two-mode, input-split, parallel, hybrid electro-mechanical transmission wherein a "mechanical point" exists in the first mode and two mechanical points exist in the second mode. U.S. Pat. No. 5,931,757 issued Aug. 3, 1999 to Schmidt, and which is hereby incorporated by reference in its entirety, teaches a two-mode, compound-split, electro-mechanical transmission with one mechanical point in the first mode and two mechanical points in the second mode.

A mechanical point occurs when either of the motor/generators is stationary at any time during operation of the transmission in either the first or second mode. The lack of a mechanical point is a drawback inasmuch as the maximum mechanical efficiency in the transfer of power from the engine to the output occurs when one of the motor/generators is at a mechanical point—i.e., stationary. In variable, two-mode, input-split, parallel, hybrid electro-mechanical transmissions, however, there is typically one point in the second mode at which one of the motor/generators is not rotating such that all the engine power is transferred mechanically to the output.

The two-mode, compound-split, electro-mechanical transmission referenced above is an efficient option for commercial-duty vehicles, such as transient buses and the like, which regularly operate at close to their maximum capacity. In very light vehicles, however, losses generated in the motor-inverter system can influence fuel economy in some instances. Also, the power to weight factors of many light vehicles cannot always be reduced if, for instance, a towing requirement establishes engine sizing.

SUMMARY OF THE INVENTION

The present invention provides an adaptation of a two-mode, compound-split, electro-mechanical transmission which is particularly useful in personal trucks, wherein the typical load is less than half of maximum capacity. The transmission provides two electrically variable modes of operation wherein the speed ratio between an input member and an output member varies with the speed of one or more electric motors. The transmission also provides six fixed-ratio modes of operation whereby six different discrete speed ratios between the input member and the output member are available. Discrete speed ratios provide a means to reduce electrical losses in some instances. The transmission enables maximum power to be reached more quickly for passing, towing and hauling, and enables the use of smaller electrical components with high power engines which may be cost-effectively implemented into personal trucks and other light vehicles.

Thus, the transmission provides a means of operating in most instances as an electrically variable transmission (EVT) wherein the engine is operated at or near minimum brake specific fuel consumption (BSFC) and/or at minimum emissions, and also provides a means to operate in a fixed ratio mode, which is especially advantageous when a very high instantaneous power is demanded (such as when passing) or a very light power is demanded for an extended duration.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic representation of a two-mode, compound-split, electro-mechanical transmission embodying the concepts of the present invention; and FIG. 2 is a fixed ratio truth table for the transmission represented by FIG. 1.

DESCRIPTION OF THE PREFERRED EMBODIMENTS

Referring to FIG. 1, an electrically-variable transmission 10 is schematically depicted. The transmission 10 includes first, second, and third planetary gearsets 14, 18, 22, each having respective first, second, and third members. More specifically, the first planetary gearset 14 includes a sun gear member 26, a ring gear member 30, and a planet carrier assembly 34. The first planetary gearset 14 is compound, and thus planet carrier assembly 34 rotatably supports a first set of planet gears 38A that mesh with sun gear member 26. The planet carrier assembly 34 also rotatably supports a second set of planet gears 38B that mesh with the first set of planet gears 38A and with ring gear member 30.

The second planetary gearset 18 includes a sun gear member 40, ring gear member 30, and a planet carrier assembly 48. It should be noted that the ring gear member 30 is common to both the first and second planetary gearsets 14, 18. Accordingly, the ring gear of the first planetary gearset 14 and the ring gear of the second planetary gearset 18 are connected for unitary rotation. The planet carrier assembly 48 rotatably supports planet gears 52 that meshingly engage ring gear member 30 and sun gear member 40. Planet carrier assembly 34 is operatively connected to planet carrier assembly 48 for unitary rotation therewith. Alternatively, and within the scope of the claimed invention, planetary gearsets 14, 18 may share a common carrier assembly that rotatably supports planet gears 38A, 38B, and 52.

The third planetary gearset 22 includes sun gear member 56, ring gear member 60, and planet carrier assembly 64. The planet carrier assembly rotatably supports planet gears 68 that meshingly engage ring gear 60 and sun gear 56. It should be noted that, where used in the claims, first, second, and third members of planetary gearsets do not necessarily refer to a member of a particular type; thus, for example, a first member may be any one of a ring gear member, sun gear member, or planet carrier assembly. Similarly, as used in the claims, the respective "first members" of two gearsets, for example, may or may not be the same type of member.

The transmission 10 also includes a first electric motor/generator 72 and a second electric motor/generator 76. An electrical storage device, such as battery 77, is provided for supplying current to motor/generators 72, 76 when operating in a motoring mode, and receiving charging current from motor/generators 72, 76 when operating in a generating mode. An electronic control unit (ECU) 78, including a microprocessor-based controller and suitable inverter circuitry, couples the battery 77 to motor/generators 72, 76, and controls the same in response to various input signals, including the driver torque request signal (not shown) and the output shaft speed signal (not shown). In a preferred embodiment, the motor/generators 72, 76 are configured as induction machines, although other configurations are also possible. The first electric motor/generator 72 includes a stator 80 rigidly affixed to a stationary member such as transmission housing 84. The first electric motor/generator 72 also includes a rotor 88. The rotor 88 is connected to the sun gear member 40 of the second planetary gearset 18 for unitary rotation therewith via an interconnecting member such as sleeve 92.

The second electric motor/generator 76 includes a stator 96 that is affixed to the housing 84, and a rotor 100. The rotor 100 is connected to sun gear member 56 via an interconnecting member, such as sleeve 104, for unitary rotation therewith. The transmission 10 also includes an input member, such as input shaft 108. The input shaft 108 is operatively connected to an engine 110, as understood by those skilled in the art. The input shaft 108 is also operatively connected to ring gear member 30 for rotation therewith.

Planet carrier assembly 34 is operatively connected to main shaft 112 for rotation therewith. Sun gear member 26 is operatively connected to sleeve 116. Planet carrier assembly 64 is operatively connected to an output member such as output shaft 120 for rotation therewith. Input shaft 108, output shaft 120, sleeves 92, 104, 116, and shaft 112 are rotatable about a common axis A. The motor/generators 72, 76 and planetary gearsets 14, 18, 22 are coaxially aligned about the axis A.

The transmission 10 further includes a plurality of selectively engageable torque transmitting devices or clutches C1–C6. More particularly, clutch C1 is a brake configured to selectively couple ring gear member 60 to the housing 84. Clutch C2 selectively couples shaft 112 and the planet carrier assembly 34 of the first and second planetary gearsets 14, 18 to the planet carrier assembly 64 of the third planetary gearset, and, accordingly, to the output shaft 120, for unitary rotation. Clutch C3 is a brake configured to selectively couple sleeve 104, and therefore the rotor 100 of the second electric motor/generator 76 and the sun gear member 56 of the third planetary gearset 22, to the housing 84. Clutch C4 is configured to selectively couple sleeve 92, and therefore rotor 88 and sun gear member 40, to sleeve 116 and, correspondingly, to sun gear member 26 for unitary rotation. Clutch C5 is configured to selectively couple sleeve 104, and therefore rotor 100 and sun gear member 56, to sleeve 116, and, correspondingly, to sun gear member 26 for unitary rotation. Clutch C6 is a brake configured to selectively couple sleeve 92, and therefore the rotor 88 of the first electric motor/generator 72 and the sun gear member 40 of the second planetary gearset 18, to the housing 84.

The transmission 10 is a two-mode, compound-split, electro-mechanical, vehicular transmission. In other words, the output member 120 receives power through two distinct gear trains within the transmission 10. A first mode, or gear train, is selected when the torque transfer device C1 is actuated in order to "ground" the outer gear member 60 of the third planetary gear set 22. A second mode, or gear train, is selected when the torque transfer device C1 is released and the torque transfer device C2 is simultaneously actuated to connect the shaft 112 to the carrier 64 of the third planetary gear set 22. The first and second modes are characterized by electrically variable operation wherein the speed ratio between the input shaft and the output shaft varies with the speed of rotor 88 and/or rotor 100. The controller 78 is configured to control the speed and the torque of the rotors 88, 100 in the first and second modes in a manner similar to that described in commonly-assigned, copending U.S. Ser. No. 10/946,915 filed Sep. 22, 2004, entitled "Two-Mode, Compound-Split, Hybrid Electro-Mechanical Transmission Having Four Fixed Ratios," and hereby incorporated by reference in its entirety.

Referring to FIGS. 1 and 2, the controller 78 is configured to control the engagement of the torque transmitting devices C1–C6 to provide, in addition to the first and second modes of electrically variable operation, six discrete, fixed speed ratios between the input shaft and the output shaft. More specifically, a first fixed speed ratio between the input shaft 108 and the output shaft 120 is obtained when clutches C1, C4, and C5 are engaged, and clutches C2, C3, and C6 are disengaged. A second fixed speed ratio is obtained when clutches C1, C5, and C6 are engaged, and clutches C2–C4 are disengaged. A third fixed speed ratio is obtained when clutches C1, C2, and C5 are engaged, and clutches C3, C4, and C6 are disengaged. A fourth fixed speed ratio is obtained when clutches C2, C5, and C6 are engaged, and clutches C1, C3, and C4 are disengaged. A fifth fixed speed ratio is obtained when clutches C2, C4, and C5 are engaged, and clutches C1, C3, and C6 are disengaged. A sixth fixed speed ratio is obtained when clutches C2, C3, and C5 are engaged, and clutches C1, C4, and C6 are disengaged.

Further, engaging C3 and C5 when the engine 110 supplies torque to the input shaft provides a means to lock rotor 100, thereby to prevent electrical losses when the reaction torque provided by motor 76 is sufficiently low. Clutch C3 also provides a fixed overdrive ratio capability when applied simultaneously with the C2 clutch. Optionally, clutch C3 may be located on the C5 drum connection to ground sun gear 26, allowing reaction for starting the engine.

Clutch C4 provides a means of interlocking the motor/generators 72, 76 at the same speed. This results in a speed of the input shaft 108, motor/generator 72, and motor/generator 76 all operating at the same speed. Because they are locked, the input power to the transmission can be the sum of the engine 110, motor/generator 72, and motor/generator 76, resulting in very high acceleration capability. The transmission 10 may be equipped with an input clutch (not shown) or other means to selectively disconnect the engine 10 and the input shaft 108. When the engine is disconnected from the input shaft, clutches C4 and C5 may be applied to provide a means of using both motor/generators 72, 76 in an electric, i.e., or engine off, mode, and provides a mode for regeneration where both units equally share the power. This may be significant on long grades, where double the cooling area and a reduction in unit power is desired.

The transmission may operate as a series transmission when clutch C5 is open, with motor/generator 72 connected to the engine 110 through the planetary gearsets 14, 18.

An additional clutch, not shown, can hold planet carriers 34, 48 to ground. This is an alternate means of providing reaction during starting. A parking pawl 120 may be connected to planet carrier assembly 64.

Moreover, clutch C4 could be applied, and the engine 110 started by motor/generator 72. In this situation, the torque of motor/generator 72 is direct to the engine 110 without ratio mechanical advantage.

In referring to the first, second and third gear sets, in this description and in the claims, these sets may be counted "first" to "third" in any order in the drawings (i.e., left to right, right to left, etc.)

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member; an output member; a stationary member; first, second, and third planetary gearsets each having respective first, second, and third members; a first motor/generator including a first rotor; a second motor/generator including a second rotor; first, second, third, fourth, fifth, and sixth torque transmitting devices;
wherein said input member is connected to said first member of said first planetary gearset;
wherein said first member of said first planetary gearset is connected to said first member of said second planetary gearset;
wherein said second member of said first planetary gearset is connected to said second member of said second planetary gearset;
wherein said third member of said second planetary gearset is connected to said first rotor;
wherein said third member of said third planetary gearset is connected to said second rotor;
wherein said second member of said third planetary gearset is connected to said output member;
wherein said first torque transmitting device is configured to selectively connect said first member of said third planetary gearset to said stationary member;
wherein said second torque transmitting device is configured to selectively connect said second member of said first planetary gearset to said second member of said third planetary gearset;
wherein said third torque transmitting device is configured to selectively connect said second rotor to said stationary member;
wherein said fourth torque transmitting device is configured to selectively connect said first rotor and said third member of said first planetary gearset;
wherein said fifth torque transmitting device is configured to selectively connect said third member of said first planetary gearset and said second rotor; and
wherein said sixth torque transmitting device is configured to selectively connect said first rotor to said stationary member.

2. The transmission of claim 1, wherein said first and second motor/generators and said first, second, and third planetary gearsets are coaxial.

3. The transmission of claim 1, further comprising an energy storage device operatively connected to said first and second motor/generators.

4. The transmission of claim 1, further comprising at least one controller configured to control said motor/generators and said torque transmitting devices to provide two modes of operation in which the speed ratio between the input member and the output member varies with the speed of said first rotor or said second rotor.

5. The transmission of claim 4, wherein said at least one controller is further configured to control said torque transmitting devices to provide six discrete forward speed ratios between said input member and said output member.

6. A transmission comprising:
an input member;
an output member;
a stationary member;
a first planetary gearset; a second planetary gearset; a third planetary gearset;
a first motor/generator having a first rotor; a second motor/generator having a second rotor; and
a plurality of selectively engageable torque transmitting devices;
wherein said input member is operatively connected to one of said planetary gearsets; wherein said first rotor is operatively connected to one of said planetary gearsets; wherein said second rotor is operatively connected to one of said planetary gearsets; wherein said output member is operatively connected to one of said planetary gearsets; wherein said plurality of torque transmitting devices are configured to selectively interconnect said planetary gearsets, said input member, said output member, said stationary member, and said first and second motor/generators to provide two electrically variable modes of operation wherein the speed ratio between the input member and the output member vary with the speed of the first rotor or the second rotor, and six fixed speed ratios between the input member and the output member.

7. The transmission of claim 6, further comprising an energy storage device configured to selectively receive energy from, and transmit energy to, said first and second motor/generators.

8. The transmission of claim 6, wherein said first, second, and third planetary gearsets each include respective first, second, and third members; and wherein said first member of said first planetary gearset is connected to said first member of said second planetary gearset; wherein said second member of said first planetary gearset is connected to said second member of said second planetary gearset; wherein said third member of said second planetary gearset is connected to said first rotor; wherein said second member of said third planetary gearset is connected to said output member; wherein said third member of said third planetary gearset is connected to said second rotor; wherein said plurality of torque transmitting devices includes first, second, third, fourth, fifth, and sixth torque transmitting devices; wherein said first torque transmitting device is selectively engageable to connect said first member of said third planetary gearset to said stationary member; wherein said second torque transmitting device is selectively engageable to connect said second member of said first planetary gearset to said output member; wherein said third torque transmitting device is selectively engageable to connect said second rotor to said stationary housing; wherein said fourth torque transmitting device is selectively engageable to connect said third member of said first planetary gearset to said first rotor; wherein said fifth torque transmitting device is selectively engageable to connect said third member of said first planetary gearset to said second rotor; and wherein said sixth torque transmitting device is selectively engageable to connect said first rotor to said stationary member.

9. A transmission comprising:
an input member;
an output member;
a stationary member;
a first planetary gearset including a first ring gear member, a first sun gear member, and a first planet carrier assembly;

a second planetary gearset including a second ring gear member, a second sun gear member, and a second planet carrier assembly;

a third planetary gearset including a third ring gear member, a third sun gear member, and a third planet carrier assembly;

a first motor/generator including a first rotor;

a second motor/generator including a second rotor;

the input member being connected to the first ring gear member for rotation therewith; the first ring gear member and the second ring gear member being interconnected for unitary rotation; the first planet carrier assembly being connected to the second planet carrier assembly for unitary rotation therewith; the first rotor being connected to the second sun gear for unitary rotation therewith; the second rotor being connected to the third sun gear for unitary rotation therewith; the third planet carrier assembly being connected to the output member for unitary rotation therewith;

a first torque transmitting device configured to selectively connect the third ring gear member to the stationary member;

a second torque transmitting device configured to selectively connect the first and second planet carriers to the third planet carrier for unitary rotation;

a third torque transmitting device configured to selectively connect the second rotor and the third sun gear to the stationary member;

a fourth torque transmitting device configured to selectively connect the first rotor and the second sun gear member to the first sun gear member for unitary rotation;

a fifth torque transmitting device configured to selectively connect the first sun gear member to the second rotor and the third sun gear member for unitary rotation; and a sixth torque transmitting device configured to selectively connect the first rotor and the second sun gear member to the stationary member.

* * * * *